United States Patent
Buckley et al.

(10) Patent No.: US 10,805,982 B1
(45) Date of Patent: Oct. 13, 2020

(54) SUPPORTED EXTENDED EMERGENCY INFORMATION TYPE

(71) Applicant: BlackBerry Limited, Waterloo, Ontario (CA)

(72) Inventors: Adrian Buckley, Tracy, CA (US); Gordon Peter Young, Kineton (GB); Michael Peter Montemurro, Toronto (CA); Jan Hendrik Lucas Bakker, Fort Worth, TX (US); Stephen McCann, Southampton (GB)

(73) Assignee: BlackBerry Limited, Waterloo, Ontario (CA)

( * ) Notice: Subject to any disclaimer, the term of this patent is extended or adjusted under 35 U.S.C. 154(b) by 25 days.

(21) Appl. No.: 16/397,606

(22) Filed: Apr. 29, 2019

(51) Int. Cl.
*H04M 9/00* (2006.01)
*H04W 76/50* (2018.01)
*H04L 29/06* (2006.01)
*H04W 48/10* (2009.01)
*H04W 12/06* (2009.01)
*H04W 48/14* (2009.01)
*H04W 88/06* (2009.01)
*H04W 84/12* (2009.01)

(52) U.S. Cl.
CPC ......... *H04W 76/50* (2018.02); *H04L 65/1006* (2013.01); *H04W 12/06* (2013.01); *H04W 48/10* (2013.01); *H04W 48/14* (2013.01); *H04W 84/12* (2013.01); *H04W 88/06* (2013.01)

(58) Field of Classification Search
CPC ....... H04W 4/90; H04W 76/50; H04W 4/029; G08B 25/016; H04L 65/1069; H04L 12/1895

See application file for complete search history.

(56) References Cited

U.S. PATENT DOCUMENTS

| 7,623,841 B2 * | 11/2009 | Aaron | H04M 11/04 348/14.01 |
| 7,787,600 B1 * | 8/2010 | Bari | H04L 12/66 379/45 |
| 2007/0032219 A1 | 2/2007 | Rudolf et al. | |
| 2013/0242847 A1 * | 9/2013 | Oh | H04L 1/0041 370/312 |

(Continued)

FOREIGN PATENT DOCUMENTS

EP 3096542 A1 11/2016

OTHER PUBLICATIONS

IEEE Standards Association, IEEE Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications, IEEE Std 802.11 2016, 3534 pages.

(Continued)

*Primary Examiner* — Khalid W Shaheed
(74) *Attorney, Agent, or Firm* — Trop, Pruner & Hu, P.C.

(57) ABSTRACT

In some examples, a wireless device receives, from a wireless access network node, an indication of a supported extended emergency information (EEI) type supported by a wireless local area network (WLAN). The supported EEI type is selected from among a plurality of different EEI types. The wireless device sends a message relating to an emergency call, the message including EEI data according to the supported EEI type.

16 Claims, 14 Drawing Sheets

(56) References Cited

U.S. PATENT DOCUMENTS

| | | | | | |
|---|---|---|---|---|---|
| 2015/0358950 | A1* | 12/2015 | Zhang | ................ | H04W 72/042 370/331 |
| 2016/0100435 | A1* | 4/2016 | Bakker | ............ | H04M 3/42348 455/404.1 |
| 2016/0345152 | A1* | 11/2016 | Melander | ................ | H04W 4/90 |
| 2018/0139762 | A1* | 5/2018 | Cho | ........................ | H04W 4/90 |
| 2018/0288582 | A1* | 10/2018 | Buckley | ................ | H04W 4/90 |

OTHER PUBLICATIONS

3GPP TS 23.167 V15.4.0, Technical Specification, 3rd Generation Partnership Project; Technical Specification Group Services and System Aspects; IP Multimedia Subsystem (IMS) emergency sessions (Release 15) (Dec. 2018) (64 pages).
3GPP TS 23.271 V15.1.0, Technical Specification 3rd Generation Partnership Project; Technical Specification Group Services and System Aspects; Functional stage 2 description of Location Services (LCS) (Release 15) (Sep. 2018) (184 pages).
3GPP TS 24.302 V15.6.0, Technical Specification 3rd Generation Partnership Project; Technical Specification Group Core Network and Terminals; Access to the 3GPP Evolved Packet Core (EPC) via non-3GPP access networks; Stage 3 (Release 15) (Mar. 2019) (176 pages).
3GPP TS 36.331 V15.5.1, Technical Specification, 3rd Generation Partnership Project; Technical Specification Group Radio Access Network; Evolved Universal Terrestrial Radio Access (E-UTRA); Radio Resource Control (RRC); Protocol specification (Release 15) (Apr. 2019) (948 pages).
3GPP TS 36.355 V15.3.0, Technical Specification, 3rd Generation Partnership Project; Technical Specification Group Radio Access Network; Evolved Universal Terrestrial Radio Access (E-UTRA); LTE Positioning Protocol (LPP) (Release 15) (Mar. 2019) (223 pages).
ATIS-0700028 v.1.1, ATIS Standard on—Location Accuracy Improvements for Emergency Calls, 2016 (86 pages).
3GPP TSG-RAN WG2 Meeting #98 R2-1704495, Hangzhou (China), Agenda item: 8.7, Source: Comtech Telecommunications Cor, Title: UE Wi-Fi MAC Address in WLAN Measurement Information, Document for: Approval, May 15-19, 2017 (2 pages).
Aboba et al., Network Working Group, Request for Comments: 3748, Obsoletes: 2284, Category, Standards Track, Extensible Authentication Protocol (EAP), Jun. 2004 (67 pages).
Rosenberg et al., Network Working Group, Request for Comments: 5389, Obsoletes: 3489, Category: Standards Track, Session Traversal Utilities for NAT (STUN), Oct. 2008 (51 pages).
Mahy et al., Internet Engineering Task Force (IETF), Request for Comments: 5766, Category: Standards Track, ISSN: 2070-1721, Traversal Using Relays around NAT (TURN): Relay Extensions to Session Traversal Utilities for NAT (STUN), Apr. 2010 (67 pages).
SA WG1 Temporary Document, 3GPP SA WG1 TD, SA WG1 Meeting SA1#81 S1-180280, Fukuoka, Japan, Source: Comtech, AT&T, Cisco, Qualcomm, Title: Emergency Location information including UE Wi-Fi MAC Address in WLAN Measurement Information, Document for: Discussion & Agreement, Agenda Item: 4, Work Item / Release: Rel-14, Feb. 5-9, 2018 (5 pages).
SA WG2 Meeting #126 S2-181724, Montreal, Canada (revision of S2-18xxxx), CR-Form-v11.2, Change Request, Title: Inclusion of UE's WiFi MAC address in emergency calls, Feb. 26-Mar. 2, 2018 (4 pages).
Galante, Tim, 3GPP TSG SA Meeting #80, SP-180298, Identification of Focus Areas for Release 16, Jun. 13-15, 2018 (7 pages).
Motorola Mobility, SA WG2 Temporary Document, SA WG2 Meeting #109, S2-151859, Utilizing WLAN Information for Emergency Services, May 25-29, 2015, Fukuoka, Japan (3 pages).
Blackberry UK Ltd., 3GPP TSG SA WG3 (Security) Meeting #86, S3-170344, Discussion of S3-170084 (CT1 LS on security of information provided via ANQP or DNS), Feb. 6-10, 2017, Sophia Antipolis (France) (3 pages).
Nokia et al., SA WG2 Meeting #116, S2-164223, Change Request, 23.402, CR 2965, rev 2, Current version: 14.0.0, Introduction of emergency services for trusted WLAN and roaming cases, Jul. 11-15, 2016, Vienna, Austria (14 pages).
European Patent Office, International Search Report and Written Opinion for PCT/EP2020/054398 dated May 15, 2020 (16 pages).

\* cited by examiner

EEI ANQP-ELEMENT (500)

Table 2

| |
|---|
| 6.2.5 EEI configuration |
| The EEI is sent using a <u>AT_EEI_RESPONSE</u>, by extending the EAP-AKA (and EAP-AKA') protocol as specified in subclause 8.2 of IETF RFC 4187. This attribute is provided in EAP-Request/AKA-Challenge or EAP- Request/AKA'-Challenge message payload respectively. The detailed coding of this attribute is described in subclause 8.2.X.1. |
| <u>6.XA   EEI configuration (X could be a 4 or a 5, so 6.4A or 6.5A etc of TS24.302 which the underlined text is against)</u> |
| <u>6.XA.1          UE Procedures</u> |
| <u>4)       If:</u> |
| <u>　　a)  the UE supports the "Configuration request";</u> |
| <u>　　b)  the EAP-Request/AKA'-Challenge message includes the AT_EEI_REQUEST_SUPPORTED attribute as described in subclause 8.2.X.1 wherein the message field as described in subclause 8.1.4.1:</u> |
| <u>　　　　1)  contains the message type field indicating EEI_REQUEST_SUPPORTED; and</u> |
| <u>　　　　2)  contains the type field including the EEI Request Supported field_item as described in subclause 8.2.X.1 indicating EEI Supported; and</u> |
| <u>　　c)  the UE requests usage of the "EEI ";</u> |
| <u>5-6)    then the UE:</u> |
| <u>　　a)  shall include the AT_EEI_REQUEST attribute according to subclause 8.2.X.2 in the EAP-Response/AKA'-Challenge message. In the message field according to subclause 8.1.4.1 of the AT_EEI_REQUEST attribute, the UE shall:</u> |
| <u>　　　　1)  set the message type field to EEI_REQUEST; and</u> |
| <u>　　　　2)  contains the type field including the EEI Request field_item as described in subclause 8.2.X.2 indicating EEI requested; and</u> |
| <u>7-8) Upon receiving the EAP-Request/AKA'-Notification message including the AT_EEI_RESPONSE attribute as described in subclause 8.2.X.3 where the message field as described in subclause 8.1.4.1:</u> |
| <u>　　-  contains the message type field indicating EEI_RESPONSE; and</u> |
| <u>　　-  contains the field EEI Encoded;</u> |
| <u>the UE:</u> |

FIG. 10A

- stores the information internally.

6.XA.2 AAA Procedures

The 3GPP AAA server may support EEI configuration.

4) If the network supports EEI configuration, the 3GPP AAA server shall include a) in the EAP-Request/AKA'-Challenge message, the AT_EEI_REQUEST_SUPPORTED attribute as described in subclause 8.2.X.1, wherein the message field as described in subclause 8.1.4.1:

1) contains the message type field indicating EEI_REQUEST_SUPPORTED; and 2) contains the type field including the EEI Request Supported field item as described in subclause 8.2.X.1 indicating EEI Supported; and 5-6) If the 3GPP AAA server supports EEI configuration; and the AAA server receives the AT_EEI_REQUEST attribute according to subclause 8.2.X.2 in the EAP-Response/AKA'-Challenge message and In the message field according to subclause 8.1.4.1 of the AT_EEI_REQUEST attribute 1) the message type field is set to EEI_REQUEST; and 2) contains the type field including the "EEI_REQUEST_SUPPORTED" value (see Table 8.1.4.1-2) as described in subclause 8.2.X.2 indicating EEI requested;

then the AAA server optionally contacts an external database e.g. HSS, PCRF, OTA server to obtain the EEI to be used and provides those EEI in the EAP-Response/AKA'-identity message.

7-8) The AAA sends the EAP-Request/AKA'-Notification message including the AT_EEI_RESP attribute as described in subclause 8.2.X.3 where the message field as described in subclause 8.1.4.1:

- contains the message type field indicating EEI_RESPONSE; and
- contains the field EEI Encoded as described in subclause 8.2.x.3.2;

8 PDUs and parameters specific to the present document

8.1 3GPP specific coding information defined within present document

8.1.4 PDUs for TWAN connection modes

8.1.4.1 Message

The message is coded according to table 8.1.4.1-2.

FIG. 10B

Table 8.1.4.1-2: Message type

| The value is coded as follows. | | | | | | | | |
|---|---|---|---|---|---|---|---|---|
| 7 | 6 | 5 | 4 | 3 | 2 | 1 | 0 | |
| 0 | 0 | 0 | 0 | 0 | 0 | 0 | 1 | CONNECTION_CAPABILITY |
| 0 | 0 | 0 | 0 | 0 | 0 | 1 | 0 | SCM_REQUEST |
| 0 | 0 | 0 | 0 | 0 | 0 | 1 | 1 | SCM_RESPONSE |
| 0 | 0 | 0 | 0 | 0 | 1 | 0 | 0 | MCM_REQUEST |
| 0 | 0 | 0 | 0 | 0 | 1 | 0 | 1 | MCM_RESPONSE |
| 0 | 0 | 0 | 0 | 0 | 1 | 1 | 1 | EEI_REQUEST_SUPPORTED |
| 0 | 0 | 0 | 0 | 1 | 0 | 0 | 0 | EEI_REQUEST |

8.2.X Identity attributes
8.2.X.1     AT_EEI_Request Supported attribute

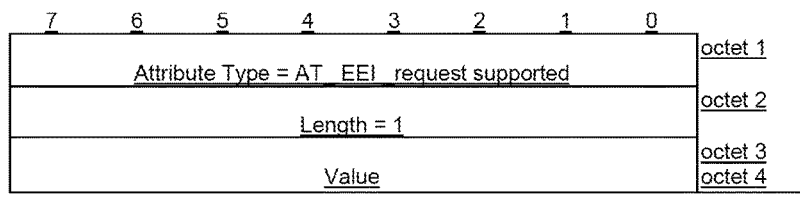

Figure 8.2.X.1-1: AT_EEI_Request Supported attribute

Table 8.2.X.1-1: : AT_EEI_Request Supported

Octet 1 (in Figure 8.2.X.1-1) indicates the type of attribute as AT_EEI_Request Supported.

Octet 2 (in Figure 8.2.X.1-1) is the length of this attribute which shall be set to 1 as per IETF RFC 4187

Octets 3 (in Figure 8.2.X.1-1) and 4 (in Figure 8.2.X.1-1) are the value of the attribute. Octet 3 (in Figure 8.2.X.1-1) is reserved and shall be coded as zero. Octet 4 (in Figure 8.2.X.1-1) shall be set as follows. All other values are reserved.

| 7 | 6 | 5 | 4 | 3 | 2 | 1 | 0 | EEI Request Supported field |
|---|---|---|---|---|---|---|---|---|
| 0 | 0 | 0 | 0 | 0 | 0 | 0 | 1 | EEI Request Supported |
| 0 | 0 | 0 | 0 | 0 | 0 | 1 | 0 | EEI Request not supported |
| 1 | 1 | 1 | 1 | 1 | 1 | 1 | 1 | Reserved |

8.2.X.2     AT_EEI_Request attribute

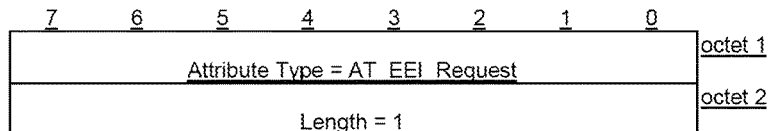

FIG. 10C

|  | octet 3 |
|---|---|
| Value | octet 4 |

Figure 8.2.X.2-1: AT_EEI_Request attribute

Table 8.2.X.2-1: : AT_EEI_Request attribute

| Octet 1 (in Figure 8.2.X.2-1) indicates the type of attribute as AT_EEI_Request with a value of 1XX.<br><br>Octet 2 (in Figure 8.2.X.2-1) is the length of this attribute which shall be set to 1 as per IETF RFC 4187<br><br>Octet 3 (in Figure 8.2.X.2-1) and 4 (in Figure 8.2.X.2-1) is the value of the attribute. Octet 3 (in Figure 8.2.X.2-1) is reserved and shall be coded as zero. Octet 4 (in Figure 8.2.X.2-1) shall be set as follows. All other values are reserved.<br><br>7 6 5 4 3 2 1 0   EEI requested field<br>0 0 0 0 0 0 0 1   EEI requested<br>0 0 0 0 0 0 1 0   Reserved<br>1 1 1 1 1 1 1 1   Reserved |
|---|

8.2.X.3 AT_EEI_Response attribute

8.2.X.3.1 General

| 7 6 5 4 3 2 1 0 | |
|---|---|
| Attribute Type = AT_EEI_Response | octet 1 |
| Length = 1 | octet 2 |
| Value | octet 3<br>octet Z |

Figure 8.2.X.3-1: AT_EEI_Response attribute

8.2.x.3.2 EEI encoded

There may be multiple EEIs encoded in the AT_EEI_Response_attribute.

| 7 6 5 4 3 2 1 0 | |
|---|---|
| EEI encoded | octet 1 |
| Length = 1 | octet 2 |
| EEI | octet 3<br>octet Z |

Figure 8.2.X.3-1: AT_EEI Response attribute Value

Table 8.2.X.3-1: : AT_EEI_Response attribute Value

| Octet 1 (in Figure 8.2.X.3-1) indicates the identity that is encoded.<br><br>Octet 3 (in Figure 8.2.X.3-1) shall be set as follows. All other values are reserved. |
|---|

FIG. 10D

| 7 | 6 | 5 | 4 | 3 | 2 | 1 | 0 | EEI Encoded field |
|---|---|---|---|---|---|---|---|---|
| 0 | 0 | 0 | 0 | 0 | 0 | 0 | 1 | EEI binary |
| 0 | 0 | 0 | 0 | 0 | 0 | 1 | 0 | EEI PLMN |
| 0 | 0 | 0 | 0 | 0 | 0 | 1 | 1 | Reserved to |
| 1 | 1 | 1 | 1 | 1 | 1 | 1 | 1 | Reserved |

When coded as "EEInfo PLMN" there can be multiple instances of the information element.

8.2.x.3.3 EEI binary

The EEI binary encoding is:

Byte 1:

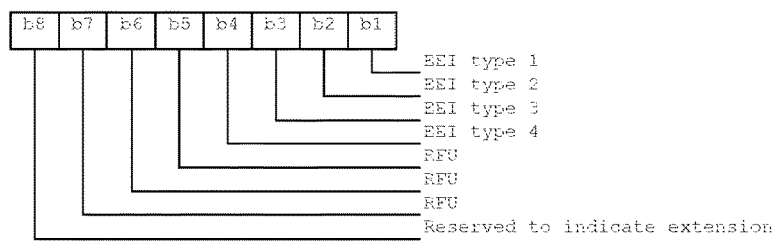

8.2.x.3.4   EEI PLMN

| 8 | 7 | 6 | 5 | 4 | 3 | 2 | 1 | |
|---|---|---|---|---|---|---|---|---|
| | | | PLMN List IEI | | | | | octet 1 |
| | | | Length of PLMN List contents | | | | | octet 2 |
| | | | EEI type encoding | | | | | octet 3 |
| MCC digit 2, PLMN 1 | | | | MCC digit 1, PLMN 1 | | | | octet 3 |
| MNC digit 3, PLMN 1 | | | | MCC digit 3, PLMN 1 | | | | octet 4 |
| MNC digit 2, PLMN 1 | | | | MNC digit 1, PLMN 1 | | | | octet 5 |
| | | | | | | | | |
| MCC digit 2, PLMN 15 | | | | MCC digit 1, PLMN 15 | | | | octet 45 |
| MNC digit 3, PLMN 15 | | | | MCC digit 3, PLMN 15 | | | | octet 46 |
| MNC digit 2, PLMN 15 | | | | MNC digit 1, PLMN 15 | | | | octet 47 |

The PLMN List IEI is 00000003 representing a "PLMN List with EEI"

The EEI type encoding (octet 3) is

FIG. 10E

```
Bits
8 7 6 5 4 3 2 1
0 0 0 0 0 0 0 1    EEI type 1 Network
0 0 0 0 0 0 1 0    EEI type 2 Network
0 0 0 0 0 1 0 0    EEI type 3 Network
0 0 0 0 1 0 0 0    EEI type 4 Network
0 0 0 0 0 1 1 0    [e.g. EEI type 2 and type 3 Network]
                   ...and so on for all the other EEI type combinations
0 0 0 1 0 0 0 0    Reserved
                   to
X 1 1 1 1 1 0 0    Reserved
```

Each bit set to 1 indicates network support for that EEI type.

For example,

- Value 1 indicates that the WLAN supports EEI type 1 and the list of PLMNs that follow only support EEI type 1
- Value 5 indicates that the WLAN supports EEI type 1 and type 3 and the list of PLMNs that follow only support EEI type 1 and type 3

Table 2 - Proposed Changes to 3GPP TS 24.302

FIG. 10F

Table 3

```
g.3gpp.EEI = BSSID, MAC
or
g.3gpp.EEI = MAC
```

Table 3 - Feature Tag Example

FIG. 11

SUPPORTED EXTENDED EMERGENCY INFORMATION TYPE

BACKGROUND

Electronic devices can communicate over wired or wireless networks. Wireless networks can include a wireless local area network (WLAN), which includes wireless access points (APs) to which devices are able to wirelessly connect. Other types of wireless networks include cellular networks that comprise wireless access network nodes to which devices are able to wirelessly connect.

Electronic devices can also make emergency calls, which are made to well published numbers (e.g., 112, 911, 999, etc.) in a country or other geographic region. Some issues may arise in connection with emergency calls.

BRIEF DESCRIPTION OF THE DRAWINGS

Some implementations of the present disclosure are described with respect to the following figures.

Figure 1:
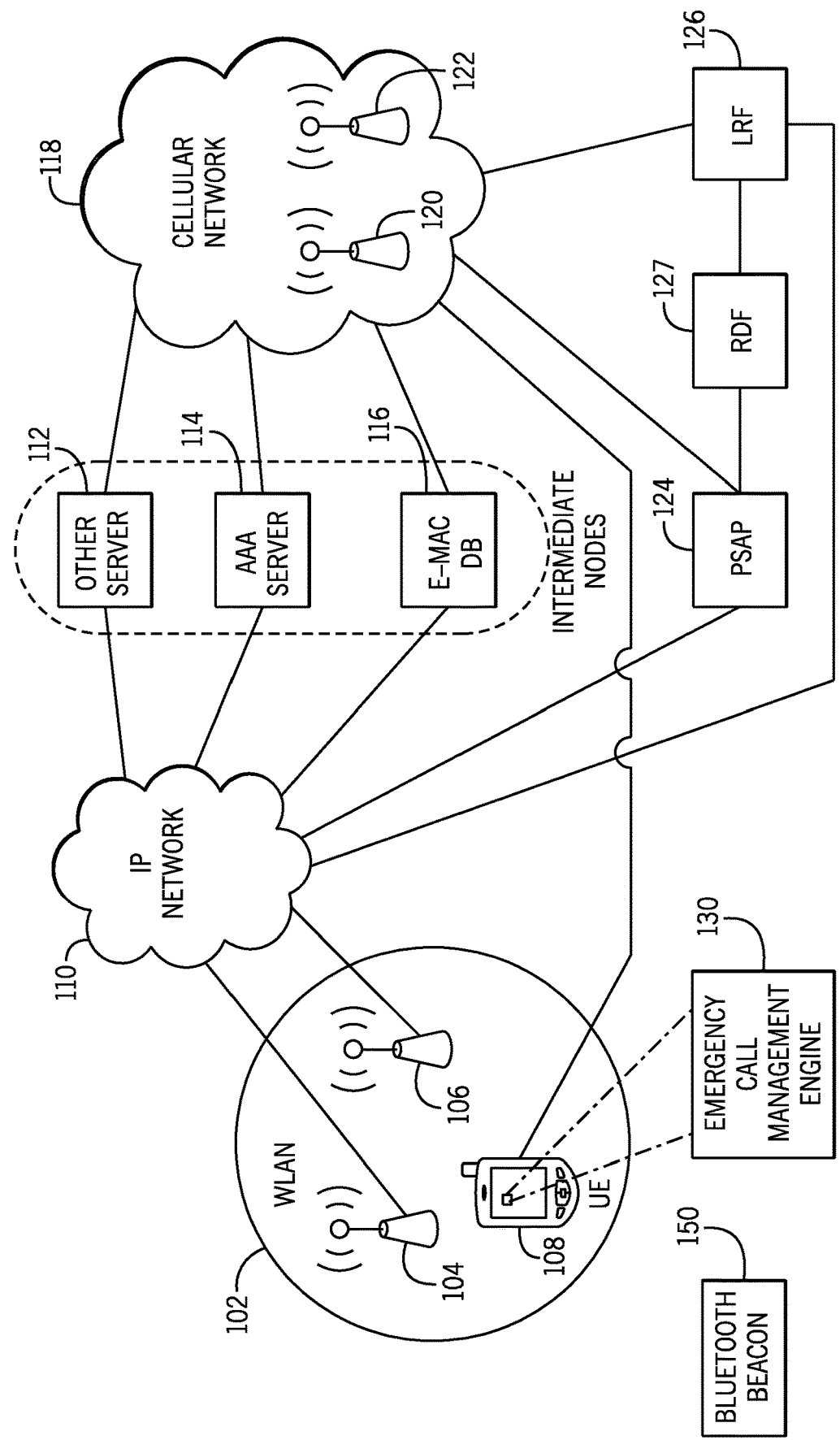
FIG. 1 is a block diagram of an example network arrangement, according to some implementations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Some electronic devices are multi-mode capable in that the electronic devices are able to communicate over different types of wireless networks, such as a WLAN, a cellular network, and/or another type of wireless network. An electronic device that is able to perform communications over two different types of wireless networks is referred to as a dual-mode capable electronic device.

Examples of electronic devices include any or some combination of the following: a desktop computer, a notebook computer, a tablet computer, a smartphone, a game appliance, an internet-of-things (IoT) device (e.g., a camera, a sensor, a vehicular component, etc.), a wearable device (e.g., a smart watch, smart eyeglasses, a head-mounted device, etc.), a server computer, a storage device, and so forth.

An electronic device that is able to communicate wirelessly is also referred to as a "wireless device."

A wireless network can include a cellular network or a WLAN. An example cellular network can operate according to the Long-Term Evolution (LTE) standards as provided by the Third Generation Partnership Project (3GPP). The LTE standards are also referred to as the Evolved Universal Terrestrial Radio Access (E-UTRA) standards. In other examples, other types of cellular networks can be employed, such as second generation (2G) or third generation (3G) cellular networks, e.g., a Global System for Mobile (GSM) cellular network, an Enhanced Data rates for GSM Evolution (EDGE) cellular network, a Universal Terrestrial Radio Access Network (UTRAN), a Code Division Multiple Access (CDMA) 2000 cellular network, and so forth. In further examples, cellular networks can be fifth generation (5G) new radio (NR) or beyond cellular networks.

A WLAN can operate according to the Institute of Electrical and Electronic Engineers (IEEE) 802.11 or Wi-Fi Alliance Specifications. In other examples, other types of wireless networks can be employed, such as a Bluetooth link, a ZigBee network, and so forth. Additionally, some wireless networks can enable Internet of Things (IoT), such as wireless access networks according to LTE Advanced for Machine-Type Communication (LTE-MTC), narrowband IoT (NB-IoT), WLAN, Bluetooth, ZigBee, and so forth.

Other types of wireless networks can be employed in other examples.

In some cases, an electronic device can make an emergency call, which is a special type of call to a well published number, such as 112, 911, 999, and so forth. Alternatively, the emergency call number can be discovered from the local network (e.g., a WLAN in a hotel). Emergency calls are terminated at special facilities referred to as Public Safety Access Points (PSAPs). Emergency calls can have higher priority than other calls, such that in case of congestion in a network, an emergency call is more likely to complete as compared to a regular call.

Regulations and/or standards have been developed for emergency calls. Regulations and/or standards governing emergency calls can specify that when an emergency call is made, a location of the caller is to be determined so that a first responder can be dispatched to the location. The determination of the location of the caller is referred to as a location service.

In a 3GPP cellular network, location services are described in 3GPP TS 23.271. In a WLAN, location services are described in IEEE 802.11-2016 and IEEE 802.11az. In further examples, the Alliance for Telecommunications Industry Solutions (ATIS) has defined a standard that can be used in North America to provide additional emergency location information.

Other types of location services can be used in other examples.

In the ensuing discussion, a dual-mode electronic device or multi-mode electronic device can be referred to as a user equipment (UE). Stated differently, a "UE" refers to an electronic device that is able to communicate using multiple modes, i.e., over different types of wireless networks. A UE that is capable of communicating over a WLAN only is referred to as a "WLAN device."

It is not always possible to obtain an accurate location of a UE that makes an emergency call over a cellular network, such as a call made from indoor locations. As such, an ATIS 0700028 standard has been developed to allow owners or operators of WLANs to optionally register the identities and physical locations of their WLAN APs (possibly with the assistance of Bluetooth beacons) in a secure database. One such database in use in the United States is called the National Emergency Address Database (NEAD). NEAD includes registered WLAN AP Basic Service Set Identifiers (BSSIDs) (and other identities), as well as Bluetooth beacon identities and their associated civic locations (e.g., physical addresses, zip codes, etc.).

In some examples, an NEAD can refer to a database created by the Cellular Telecommunications and Internet Association (CTIA). The NEAD can store Dispatchable Location information comprising civic location and geo-coded location for Reference Points configured from known locations of specific WLAN APs and/or Bluetooth beacons. The NEAD responds to queries for Dispatchable Location information from a serving core network in support of individual emergency calls.

The ATIS standard defines a "Reference Point," which can include the WLAN AP BSSID, such as a Medium Access Control (MAC) address of an AP, and/or a Bluetooth Public Device Address (BT-PDA) that can be accessed by a UE during an emergency call. This is referred to as the ATIS solution.

It should be noted however, some enterprises include WLAN APs and can store the physical location of their respective APs (and Bluetooth devices), but these enterprises do not provide the location information directly to the NEAD. The NEAD however may store related enterprise WLAN network identifier information in order to facilitate a further WLAN AP query by a WLAN external location server associated with the enterprise WLAN network.

In other examples, some owners or operators of WLAN APs may not opt to support civic addresses used in the NEAD. The owners or operators may use an alternative mechanism where a determination of a UE location is performed using an associated location server and identified by the UE's MAC address. This is referred to as the 3GPP solution. The location server can store a mapping between a UE's MAC address and a civic address. This mapping may have to be updated each time the UE re-associates to the WLAN, as the UE may change its MAC address.

An issue can arise when a UE attempts to make a packet-switched emergency call over a cellular network, such as a UTRAN, an E-UTRAN, an NG-RAN, an NR or 5G wireless network, and so forth. A packet-switched emergency call over a cellular network can be based on use of a Session Initiation Protocol (SIP), which is a protocol governing messaging for establishing and controlling packet-switched communication sessions. In a SIP-based emergency call, the UE can include an extended emergency location (EEL) that can be used to refine the UE's location. EEL can refer to location information for emergency situations.

Generally, a mechanism or technique does not exist for a UE to determine whether an NEAD or a location server (discussed above) is supported by a WLAN. More specifically, a UE does not know whether a WLAN AP supports an NEAD solution, a location server solution, or another solution. The UE also does not know what type of EEL information is preferred by a PSAP and/or intermediate network elements, and whether multiple types of EEL can be used.

Also, techniques are not provided for determining whether a cellular network that the UE is attached to supports any location mechanism. The UE may not be able to determine if a network the UE is attached to supports a positioning technology enabling accurate determination of the UE's position.

A mechanism may not be provided to provide a MAC address assigned to the UE to a PSAP and/or an intermediate network element. The PSAP and/or intermediate network element may have to know the UE's MAC address (unique reference) to use the WLAN location. If the UE's MAC address changes, then the changed MAC address is transmitted to the PSAP and/or intermediate network element. The PSAP uses the MAC Address (as a look-up) to query the WLAN to determine the UE's location.

1. Enhanced WLAN Location for SIP Emergency Calls

FIG. 1 is a block diagram of an example arrangement that includes a WLAN 102 in which WLAN APs 104 and 106 are present. Although two WLAN APs are shown in FIG. 1, it is noted that the WLAN 102 can include a different number (e.g., 1, or greater than 2) APs and other examples. A UE 108 is able to communicate wirelessly with WLAN APs 104 and/or 106 in the WLAN 102.

Although two WLAN APs 104 and 106 are shown in FIG. 1, it is noted that in other examples, a different number (one or greater than two) of APs can be employed. Also, there can be more than one UE that can communicate wirelessly with the WLAN APs 104 and/or 106.

More generally, in other examples, other network arrangements different from that depicted in FIG. 1 can be employed.

The WLAN APs 104 and 106 can be connected to an Internet Protocol (IP) network 110 (or another type of data network), which is also coupled to various intermediate network elements 112, 114, and 116. The intermediate network elements 112, 114, and 116 are in turn connected to a cellular network 118.

In some examples, the intermediate network elements include an authentication, authorization, and accounting (AAA) server 114 (which performs authentication, authorization, and accounting tasks for UEs), an Extended MAC address (E-MAC) database 116 (which contains location information, such as EEL information, together with the EEI type(s) of each UE), and another server 112. The E-MAC database 116 can also be referred to as an "E-MAC server". The combined EEL and associated EEI types(s) for each UE is referred to as an EEL data set.

The cellular network 118 includes cellular access network nodes 120 and 122 (e.g., base stations, Evolved Node Bs or eNBs, etc.). Although two cellular access network nodes are shown in FIG. 1, in other examples, the cellular network 118 can include a different number of cellular access network nodes. UEs 108 (not shown) can communicate with the cellular access network nodes 120 and 122.

A PSAP 124 can be connected to the cellular network 118 and the IP network 110. A "PSAP" can refer to a physical location or entity at which emergency calls from the public are received.

In addition, a Location Retrieval Function (LRF) 126 can also be connected to the cellular network 118. The LRF 126 can be implemented as a computing node, or can be included as part of the PSAP 124. The LRF 126 handles the retrieval of location information for a UE. The LRF 126 may interact with a Routing Determination Function (RDF) 127 or a separate location server to obtain routing or location information, respectively. The RDF 127 provides the proper PSAP destination address for routing an emergency call request. The RDF 127 may interact with the location server to manage call routing in order to give location information to the PSAP 124.

WLANs typically have known locations, so the UE 108 that has a relationship with the WLAN 102 can inform the cellular network 118, the intermediate network elements, or the LRF 126 about this relationship. This then enables one of these elements to look up the EEL associated with the UE 108, which can be then forwarded to the PSAP 124.

In some implementations of the present disclosure, the UE 108 can determine whether enhanced emergency location (EEL) is supported in a local wireless network (WLAN or cellular network), and whether the EEL can be provided to the cellular network to which a PSAP is connected. This determination can be made prior to an emergency call being made (e.g., when the UE 108 comes into radio range of the local wireless network), or once an emergency call commences. The EEL may also be used to determine the PSAP (e.g., 124) that is closest to the UE.

In accordance with some implementations of the present disclosure, an emergency call management engine 130 in the UE 108 can perform the following checks before the EEL can be used:

Is there a local WLAN (e.g., 102) that supports an extended emergency information (EEI) mechanism (e.g., an EEI type)?

Does the cellular network 118 also support the same EEI type?

Is there a relationship between the local WLAN and the cellular network?

An EEI includes information about the EEL accuracy types (EEI types) supported.

As used here, an "engine" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, an "engine" can refer to a combination of a hardware processing circuit and machine-readable instructions (software and/or firmware) executable on the hardware processing circuit.

The emergency call management engine 130 in the UE 108 can also determine if a location retrieval system (e.g., the LRF 126 and/or the intermediate network elements 112, 114, and 116) of the cellular network 118 can alternatively use the EEL information of the WLAN 102, so that the EEL information within the emergency call SIP message can be passed to the PSAP 124. In examples where the EEL information is passed to the PSAP 124, the PSAP 124 does not have to have a new interface or protocol to an intermediate network element or the WLAN 102. In other examples, the PSAP 124 may query an intermediate network element to obtain the EEL information, or the intermediate network element provides the EEL information via a separate protocol or SIP session.

The following describes some tasks that can be performed by respective entities depicted in FIG. 1.

The PSAP 124 is able to process either emergency calls from a UE (e.g., 108 in FIG. 1) or the cellular network 118, and is able to access a new database (e.g., the E-MAC database 116) that contains the EEL of the UE 108.

The E-MAC database 116 stores EEL information associated with UEs. The location information (EEL information) can be indexed using one or more of the following EEI types:

EEI type 1, the WLAN AP BSSID is used (for the ATIS solution).

EEI type 2, the UE MAC address is used (for the 3GPP solution).

EEI type 3, the UE IP address is used (for other location protocols).

EEI type 4, the BT-PDA is used (for the ATIS solution). It is assumed that a Bluetooth device (e.g., a Bluetooth beacon 150) is within radio range of the UE 108, which has an operational Bluetooth interface.

In some examples, the location information includes the current location of the UE 108, or the location of the associated WLAN AP or Bluetooth device or a combination of these.

The location information can include information of geographical or civic locations (or both).

The E-MAC database 116 maps at least one mobile country code (MCC) to an EEI type, so that EEI types can represent different location mechanisms in different countries. In some cases, one country may be identified by more than one MCC.

The AAA server 114 authenticates UEs associating to the WLAN 102, and passes location information to the E-MAC database 116 (either as a new entry or an update of an existing entry in the E-MAC database 116).

In some examples, some WLAN APs 104 and/or 106 can provide in-building access to UEs.

Bluetooth beacons (e.g., 150) provide additional location information that can be used to provide finer grained location of the UE 108. The Bluetooth public address (BT-PDA) is determined by the WLAN infrastructure and passed to the E-MAC database 116.

In some examples, UE MAC address privacy can be provided. In other words, the MAC address of the UE changes each time the UE associates to a WLAN and this change is transmitted to the PSAP and/or an intermediate network element.

The E-MAC database 116 has the capability to map E-MAC database records to a location in a building.

Indications

In accordance with some implementations of the present disclosure, to proceed with an emergency call, the UE 108 can be provided with any or all of the following indications. An "indication" can refer to a message, an information element, or any other information.

A $1^{st}$ indication indicates that EEI is supported by a local WLAN (e.g., a WLAN that is within radio range of the UE 108).

A $2^{nd}$ indication indicates the EEI type(s) supported by the WLAN.

A $3^{rd}$ indication indicates the (one or more) Public Land Mobile Networks (PLMNs) of the cellular system to which the WLAN has connectivity (if any).

A $4^{th}$ indication indicates the registered PLMN (RPLMN) of the cellular system. The RPLMN is the PLMN on which certain location registration outcomes have occurred. In a shared network, the RPLMN is the PLMN defined by the PLMN identity of the core network operator that has accepted the location registration of the UE.

In some examples, the 1st indication and 2nd indication can be part of the same indication (e.g., message, information element, etc.).

The $1^{st}$, $2^{nd}$, $3^{rd}$, and/or $4^{th}$ indications can be determined by the emergency call management engine 130 of the UE 108 from either the cellular network or WLAN, based on any or some combination of the following: (1) receiving the indication(s) in broadcast information from the cellular network or WLAN, (2) obtaining the indication(s) by sending a first message and receiving a second message (e.g., query response mechanism), (3) receiving the indication(s) in an authentication procedure, and/or (4) being already associated or registered with the wireless network or having stored (cached) information in the UE.

WLAN Check

The $1^{st}$ indication and $2^{nd}$ indication can be used by the emergency call management engine 130 of the UE 108 to perform a check of the WLAN 102. For example, the $1^{st}$ indication and $2^{nd}$ indication can be used by the emergency call management engine 130 of the UE 108 to determine the EEI capability of the WLAN 102 (i.e., whether the WLAN 102 supports EEI and/or the EEI type(s) is (are) supported by the WLAN 102).

Cellular Network Check

The emergency call management engine 130 of the UE 108 can use the $4^{th}$ indication to perform a check of the cellular network 118. For example, the emergency call management engine 130 determine whether information of the 4th indication (e.g., identifier of the RPLMN) matches the MCC and mobile network code (MNC) pair of the PLMN indicated by the Vindication. Alternatively, there may be a PLMN (e.g., represented by an MCC, MNC pair) that matches the RPLMN or an equivalent RPLMN. Equivalent RPLMN codes would have been received in a SIP ATTACH ACCEPT message or REGISTER ACCEPT messages, when the UE registered with the RPLMN.

In some examples, the Vindication and $4^{th}$ indication can be structured as a (1) network identity or (2) a country identity. The network identity that a PLMN takes can be in the form of a pair of an MCC and MNC. The country identity can be in the form of an MCC, which if received by the UE 108 may imply all networks in that country support the EEI.

The UE can send any of the foregoing indications (with optionally associated WLAN identifiers) in a message associated with an emergency session, e.g., a SIP INVITE, a SIP UPDATE, a SIP REINVITE, or any other SIP message. The indications may also be included in NAS messages for an NG RAN or 5G network, for example.

Errors

If the WLAN 102 or the cellular network 118 does not support EEI, then emergency call establishment can stop, and a reason code indicating the issue can be returned to the UE 108 either through the cellular network 118, the WLAN 102, or a server in a network. A similar reason code (and success code) can also be transmitted at other stages in other examples.

EEI Message Flow

Figure 2:
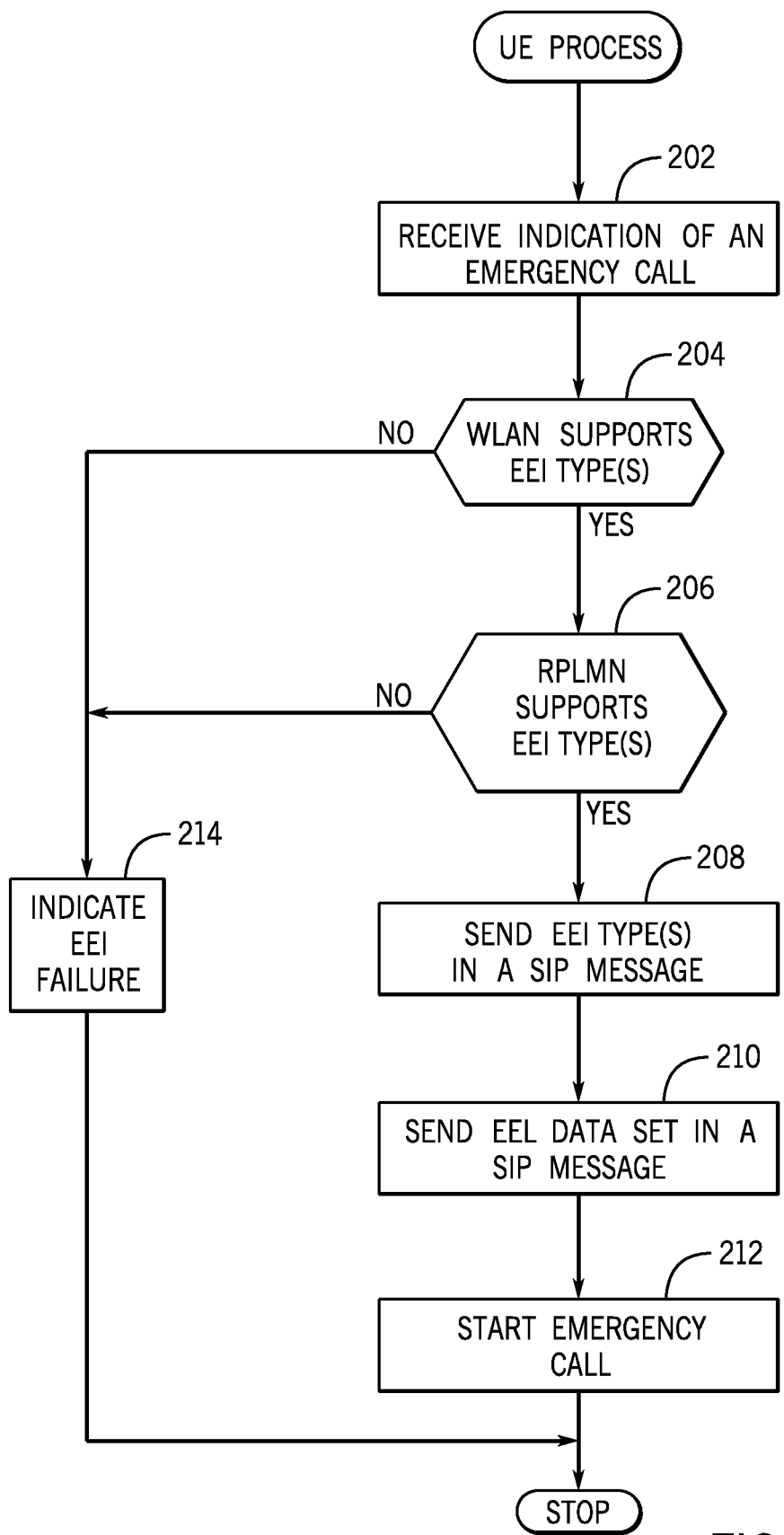
FIG. 2 is a flow diagram of a process of a user equipment (UE), according to some implementations.

FIG. 2 is a message flow diagram of a process according to some examples. Note that although a specific order of tasks is shown in FIG. 2, it is noted that the tasks can be performed in a different order in other examples, or additional or alternative tasks may be included in the process. For example, task 202 does not have to occur before task 204, as the UE 108 can determine the supported EEI in a network before any emergency call occurs.

The UE 108 receives (at 202) an indication of an emergency call. The indication of the emergency call can be initiated by a user of a UE or can be initiated by a network. For example, the indication can be a dialed or typed string or a button press at the UE 108. Alternatively, the indication can be received from the network in a SIP message (e.g., a SIP 380 message, a SIP 1xx or 2xx response message, or another SIP message), or in another type of message.

The UE 108 performs (at 204) various checks of the WLAN 102. For example, the UE 108 determines whether authentication has to be performed with a WLAN AP, such as by use of an open authentication without credentials. The UE 108 can make this determination using any of the following techniques. The UE 108 can perform analysis of the information in a WLAN beacon, information in a Probe response, or information in an Access Network Query Protocol (ANQP) element of an ANQP response. Alternatively, the UE 108 can analyze cellular network broadcast information.

Another WLAN check performed by the UE 108 includes determining, by the emergency call management engine 130 of the UE 108, if the WLAN 102 supports one or more EEI types. This can be based on the $2^{nd}$ indication discussed above, for example. Although not shown, the emergency call management engine 130 of the UE 108 can also determine, based on the $1^{st}$ indication, whether the WLAN 102 supports EEI.

If the WLAN 102 does not support any EEI type (as determined based on the $1^{st}$ and/or $2^{nd}$ indication, then the emergency call management engine 130 of the UE 108 can determine if there is a second AP or WLAN (within radio range of the UE 108) that supports one or more EEI types. The emergency call management engine 130 may then request the UE 108 to move to the second AP or WLAN for the emergency call.

The UE 108 can successfully obtain IP connectivity with a WLAN AP of the WLAN 102 or the second WLAN using a MAC address.

The emergency call management engine 130 of the UE 108 next performs (at 206) cellular network checks, and more specifically, checks of an RPLMN to determine if the RPLMN supports any EEI type(s). If the UE has already received information from the RAN, such as broadcast information, then the UE 108 does not have to perform this task, as the UE 108 already knows that the RAN supports an EEI type(s).

Otherwise, the UE 108 sends a SIP message to the RPLMN to cause the RPLMN to send a response to the UE 108, where the response can include information about the EEI type(s) supported by the RPLMN, or the response can indicate that the RPLMN does not support any EEI type. The UE 108 may also send (at 208) an EEI type(s), a UE MAC address, a WLAN identifier (e.g., WLAN AP BSSID), an IP address, a BT-PDA, and so forth in the SIP message.

The UE 108 can determine the PLMN of the cellular network 118 to which the WLAN 102 is connected using an existing ANQP-element. The UE 108 can compare network identities (e.g., identities of PLMN(s)) received from the WLAN 102 and compare the network identities against an RPLMN identity or, if received, equivalent RPLMN identities.

The PSAP 124 can use the EEI type(s) to determine a location of the UE 108. Alternatively, the UE 108 sends (at 210) an EEL data set in a SIP message over the cellular network 118, which is passed to the PSAP 124. This allows the UE to transmit a more up to date location with the emergency call. When the PSAP 124 receives an EEL data set in a SIP message, it can update the corresponding UE location in the LRF or intermediate network element. An EEL and the associated EEI types(s) of the UE 108 included in the SIP message can be referred to as an EEL data set and may include any or some combination of the foregoing information. There may be multiple EEL data sets depending upon the number of WLANs to which the UE 108 has an association and the number of EEL formats that the UE 108 supports.

The SIP messages may include any of the following: INVITE, UPDATE, RE-INVITE, REGISTER (e.g., when registering with SIP for emergency), and so forth. Other (non-SIP) messages may include ATTACH, (5G) REGIS- TRATION, TRACKING AREA UPDATE, SERVICE REQUEST, Packet Data Network (PDN) CONNECTION REQUEST, Packet Data Unit (PDU) SESSION REQUEST, and so forth.

At this point, the emergency call between the UE 108 and the PSAP 124 is started (at 212).

If the emergency call management engine 130 of the UE 108 determines (at 204) that the WLAN 102 (and possibly the second WLAN) does not support any EEI type, or the emergency call management engine 130 of the UE 108 determines (at 206) that the RPLMN does not support any EEI type, then the emergency call management engine 130 of the UE 108 indicates (at 214) an EEI failure, and may provide a reason code for the EEI failure (e.g., the reason code can indicate that the WLAN 102 or the RPLMN does not support any EEI type). In some examples, the EEI failure may be referred to as an EEL failure.

2. Details Regarding Various Implementations 2.1 Emergency Call Indication

Task 202 in FIG. 2 involves the UE 108 receiving an indication of an emergency call.

This can be accomplished in a number of different ways.

The UE 108 detects from decoding a received alphanumeric string that the alphanumeric string matches an alphanumeric string that is a known or published emergency number, e.g., 911, 112, 999, etc.

Alternatively, as part of session initiation, the UE 108 receives from a network a message that indicates that the session is an emergency session. The message can include any of the following messages.

A 1$^{st}$ response message, such as SIP 180 or SIP 2xx, indicates that the session has been allowed to be continued. In this case, the UE 108 will be in the process of setting up a session for an emergency call.

Alternatively, the message can be the 1$^{st}$ response message indicating that the session has been allowed to be continued, and the UE 108 can determine based on an indicator in the 1$^{st}$ response message that the session request was a session request including an emergency number.

As another example, the message can be a 2$^{nd}$ response message, e.g., SIP 380, which indicates that the UE 108 made a session origination but the network has detected that the session origination is an emergency session. The UE 108 should re-attempt the session and use emergency procedures.

2.2 Does WLAN Support an EEI Type?

Task 204 in FIG. 2 includes the UE 108 determining if the WLAN 102 supports one or more EEI types.

2.2.1 WLAN and EEI Type Discovery

The UE 108 scans and finds a WLAN. Note that the UE 108 may use a random or changing MAC address for privacy reasons while scanning and operating on a WLAN.

The UE 108 discovers the EEI type(s) that is (are) supported by the WLAN by either (1) receiving RAN broadcast information (discussed further in section 2.7 below), or (2) using an ANQP request/response messaging (see section 2.6 below).

In other examples, the UE 108 can discover the EEI type(s) that is (are) supported by the WLAN using a different technique.

These messages are also shown as messages 304-*a* and 304-*b* in FIG. 3, or 404-*a* and 404-*b* in FIG. 4 (discussed further below).

Discovery of supported EEI type(s) can be repeated a number of times depending upon if the received information from the network indicates support for multiple options. If the tasks relating to discovery of supported EEI type(s) have been repeated multiple times, it is possible that multiple MAC addresses have been registered with respective WLANs. These MAC addresses can include (1) a first MAC address registered with a first WLAN (first identifier) having a first IP address, (2) a second MAC address registered with a second WLAN (second identifier) having a second IP address, and (3) an Nth (N>1) MAC address registered with an Nth WLAN (Nth identifier) having an Nth IP address.

The MAC addresses can be all the same, or not the same. Alternatively, there can be MAC addresses associated with groups of WLANs, e.g., a first MAC address associated with a first group containing WLANs 1 to p, a second MAC address associated with a second group containing WLANs q to z, and so forth.

2.2.2 MAC Address Determination

As discussed in connection with FIG. 2, as part of discovering a WLAN that supports EEI type(s), the UE 108 associates and authenticates with the WLAN. To do so, the UE 108 determines a MAC address to use to connect with the WLAN.

Figure 3:
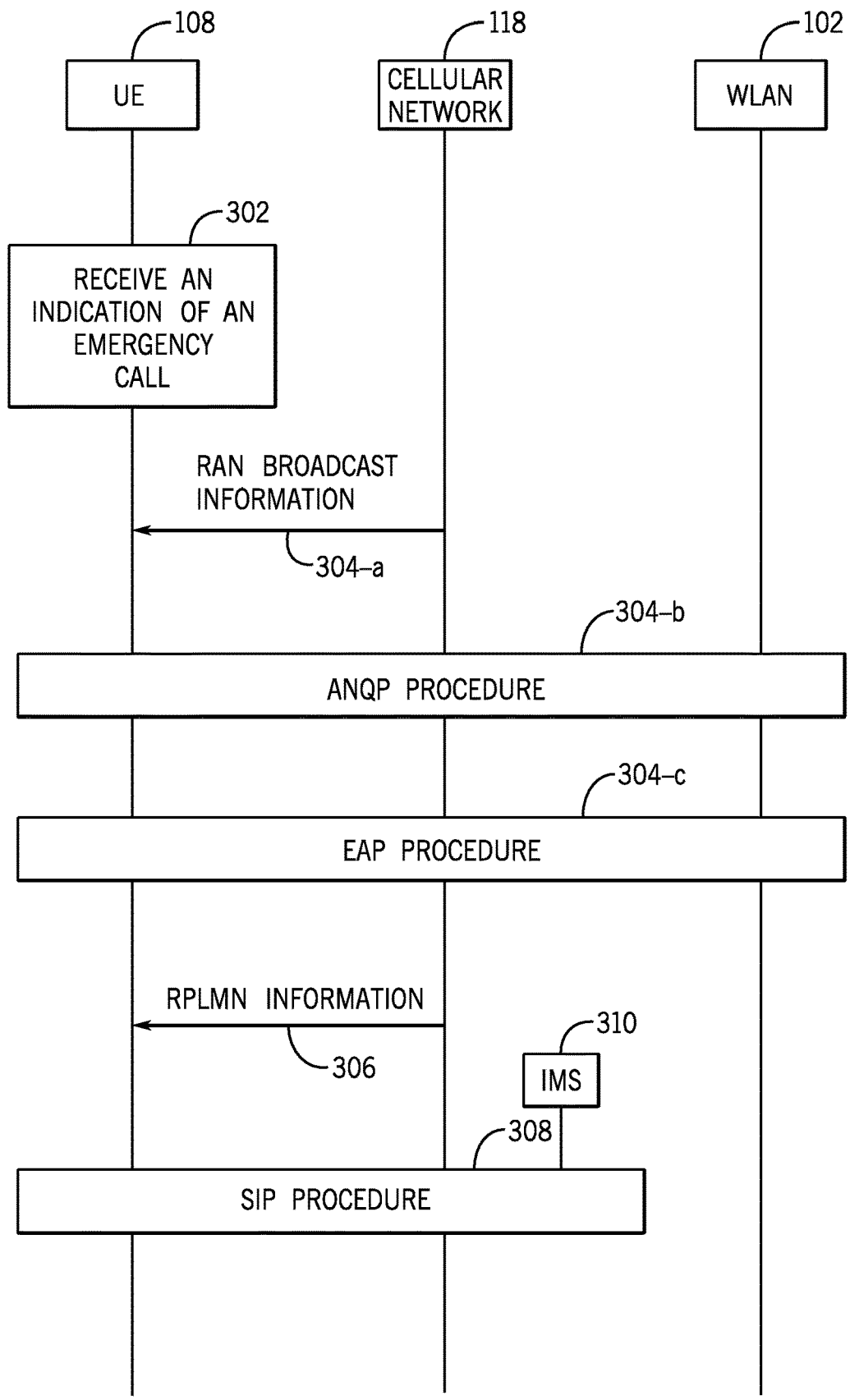
FIGS. 3 and 4 are message flow diagrams according to some implementations.

FIG. 3 shows an example of determining a MAC address in a scenario where the UE 108 has no pre-existing WLAN association. FIG. 4 shows an example of determining a MAC address in a scenario the UE 108 has a pre-existing WLAN association.

As shown in FIG. 3, the UE 108 receives (at 302) an indication of an emergency call, which is similar to task 202 in FIG. 2.

Tasks 304-*a*, 304-*b*, and 304-*c* are several options useable by the UE 108 to perform the WLAN checks of task 204 in FIG. 2. As noted above, the UE 108 can receive (at 304-*a*) RAN information from the cellular network 118, which can be used by the UE 108 to perform the WLAN checks.

Alternatively, the UE 108 can perform the WLAN checks based on exchanging (at 304-*b*) with the WLAN 102, an ANQP request (sent by the UE 108 to the WLAN 102) and an ANQP response (sent by the WLAN 102 to the UE 108 in response to the ANQP request. In the ANQP procedure (304-*b*), the UE 108 may also send its UE MAC address and BT-PDA (e.g., from the closest Bluetooth beacon or a list of beacons) to the WLAN 102.

Alternatively, the sending of the UE MAC address by the UE 108 may be performed using a type-length-value (TLV) in an Extensible Authentication Protocol (EAP) exchange 304-*c*. In such examples, EAP can be used to determine whether the WLAN 102 supports EEI type(s).

For example, the following TLVs could be defined to carry the information:

Type: wlanMAC; Length: 6; Value: {a 6 octet string containing the MAC address of the UE}.

Type: btBeaconInfo; Length: 17; Value {a 15 octet string containing the UUID of a received Bluetooth beacon}{1 octet indicating TX Power from received beacon}{1 octet indicating the RSSI of the received beacon}.

The UE 108 can also include the information in an EAP Request frame, such as according to the following format: {wlanMAC}{btBeaconInfo1}{btBeaconInfo2}{btBeaconInfo3}

The UE 108 can also encode similar information in an ANQP request frame with each TLV mapped to a new ANQP-element (task 304-*b*).

At the end of the EAP procedure (task 304-*c*), there should be a UE MAC address that is registered with the WLAN 102. The UE 108 may also perform a Session Traversal Utilities for Network Address Translation (STUN) procedure (as described in Request for Comments (RFC) 5389) or a Traversal Using Relays around Network Address Translation (TURN) procedure (as described in RFC 5766) to determine the external IP address of the WLAN 102, which can be used as an EEI type 3 value.

The UE 108 (or the WLAN 102) packages the EEL data set (i.e., EEL and associated EEI type(s)) in a message and transmits the EEL data set, to update any entry, within either the AAA server 114, an intermediate network element, or the E-MAC database 116. The UE 108 can package this information in a new IEEE 802.11 frame over the air (e.g., a new information element), which in turn is included in either a Remote Authentication Dial-In User Service (RADIUS) request frame or a RADIUS accounting frame by the WLAN 102 (typically the AP to which the UE is associated). The packaged information is then forwarded to the AAA server 114, to an intermediate network element, or the E-MAC database 116. When the WLAN 102 creates the package (on behalf of the UE 108), the information is just packaged in a RADIUS frame. Security protection can be applied to IEEE 802.11 frames sent over the air.

When the UE 108 transitions from one AP to another AP, the UE 108 may send a message to update the EEL data set (i.e., EEL and associated EEI type(s)). The UE 108 can also periodically transmit an EEL data set update to refresh the EEL data set. Again, the WLAN 102 can act on behalf of the UE in both of these situations.

FIG. 3 further shows the UE 108 receiving (at 306) RPLMN information to perform the RPLMN check of task 206 in FIG. 2. In addition, the UE 108 performs (at 308) a SIP procedure with an IP Multimedia System (IMS) 310, which includes the sending of the SIP message in task 210 of FIG. 2. Tasks 306 and 308 are discussed further below.

In FIG. 3, the receiving of the emergency call indication (302) occurs before task 304-a, 304-b, or 304-c, for the scenario where the UE 108 does not have a pre-existing WLAN association.

Figure 4:
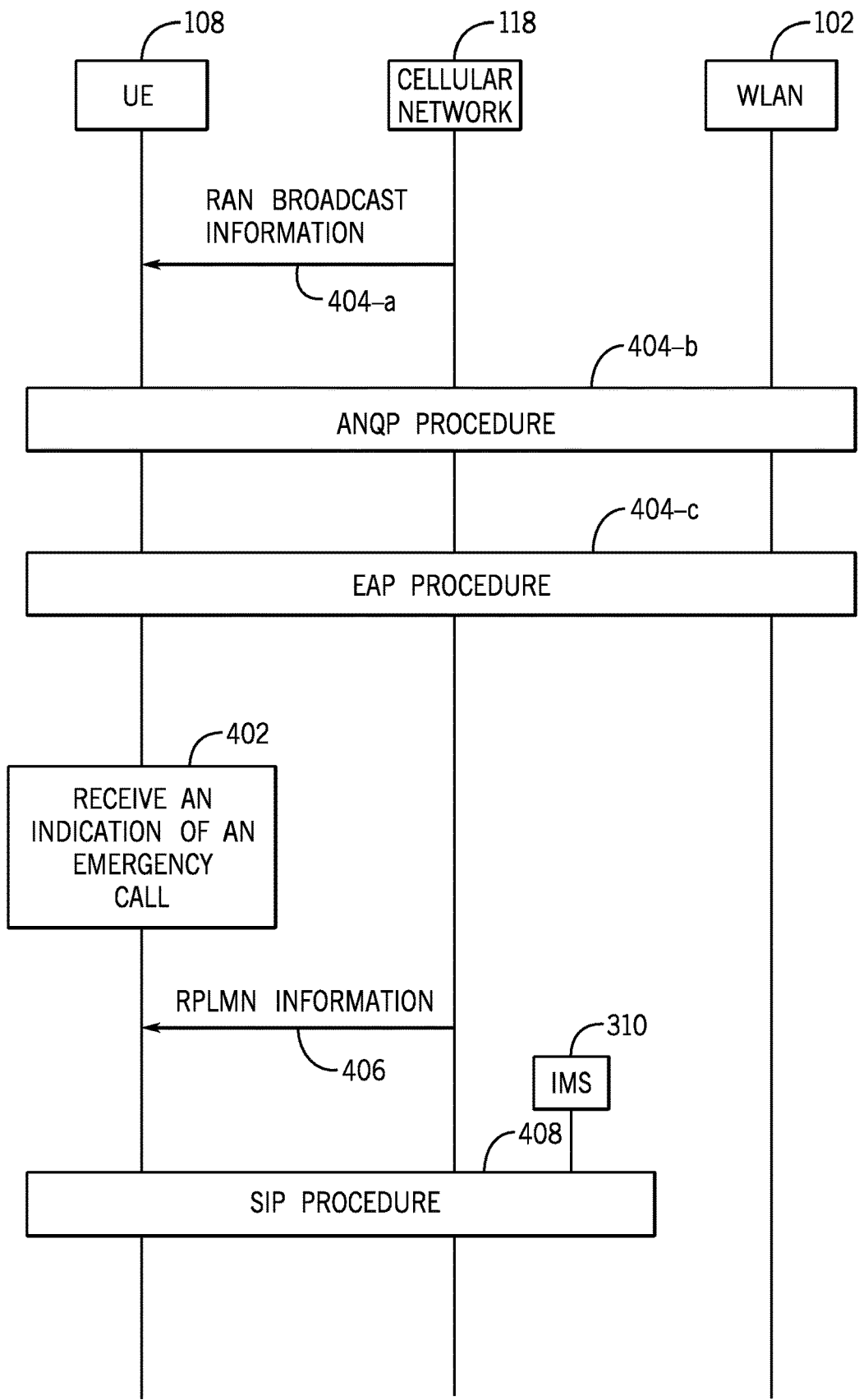

FIG. 4 shows that the emergency call indication is received (at 402) after task 404-a, 404-b, or 404-c. Tasks 404-a, 404-b, and 404-c are similar to tasks 304-a, 304-b, and 304-c, respectively, of FIG. 3.

Tasks 406 and 408 are similar to tasks 306 and 308, respectively, of FIG. 3.

2.3 Does RPLMN Support the EEI Type?

This section describes in further detail task 206 (FIG. 2), 306 (FIG. 3), or 406 (FIG. 4).

If the UE 108 determined the presence of a WLAN that supports an EEI type from the RAN broadcast information (see section 2.2.1 and task 304-a of FIG. 3 or task 404-a of FIG. 4), then a separate determination of whether the RPLMN supports an EEI type may not have to be performed.

The UE 108 can check the 3rd and 4th indications (see section 1) to ensure that the WLAN 102 has some relationship to the same RPLMN; in other words, the WLAN and RPLMN have access to an intermediate network element (such as the E-MAC database 116) that provides location information. This then allows an intermediate network element (or the PSAP 124 itself) to fetch the UE's EEL, when an emergency SIP call is placed from the RPLMN.

The UE may have received a 4th indication in a mobility management message, a SIP message, or a broadcast message. In addition, any of these delivery mechanisms for the 4th indication may have included Equivalent Network Identities.

The UE performs a comparison between the Vindication (PLMN) and 4th indication. If the Vindication is a country code and the country code is the same as the 4th indication (or an Equivalent Network Identity), then the RPLMN supports that EEI type.

If the 3rd indication is a PLMN and the 4th indication (or an Equivalent Network Identity) matches the Vindication, then the RPLMN supports the EEI type.

2.4 EEL Data Set in a SIP Message

This section provides further details regarding task 210 (FIG. 2), task 308 (FIG. 3), or task 408 (FIG. 4).

The UE 108 determines the EEL data set to include in a SIP message (see section 2.9 for further details) to be sent to the RPLMN, based on the supported EEI type(s) of the WLAN and the RPLMN. The EEI type is used as an index in the E-MAC database 116 for the EEL information.

For EEI type 1, the WLAN AP BSSID is used (for the ATIS solution) as the index. For EEI type 2, the UE MAC address is used (for the 3GPP solution) as the index. For EEI type 3, the UE IP address is used (for other location protocols) as the index. For EEI type 4, the BT-PDA is used (for the ATIS solution) as the index.

For EEI type 3, the UE 108 may perform EAP authentication to obtain an IP address. Multiple instances of the information above can be included.

The SIP message can be an INVITE message if the UE has not already initiated the session, e.g., emergency session to the network.

The SIP message can be a RE-INVITE or UPDATE message if the UE has already performed a session origination.

2.5 PSAP Determines the EEL from the EEI Type(s)

Once the PSAP 124 receives a SIP message containing the EEL data set for establishing an emergency call, the PSAP 124 uses one or more of the identifiers (EEI type(s)) from the EEL data set, to look up the location information in the E-MAC database 114.

2.6 EEI ANQP-Element Definition

The following describes how the UE 108 is able to determine what EEI type(s) is (are) supported by the WLAN 102. This may be performed using Public Action frames, or using a protocol such as ANQP. The determination can be performed either before the UE 108 associates to the WLAN 102 (pre-association), during or after association.

Encoding similar to that shown below can be used to enhance the Wi-Fi Alliance Hotspot 2.0 Specification.

A new EEI ANQP-element is defined as follows, and the following underlined text in the tables below represents example changes to the IEEE 802.11-2016 Specification. The table numbers below are table numbers of the IEEE 802.11-2016 Specification. These changes are in line with messages described in the tables above in Section 2.

TABLE 9-271

ANQP-element definitions

| ANQP-element name | Info ID | ANQP-element (subclause) |
|---|---|---|
| Reserved | 0-255 | n/a |
| Extended Emergency Information | 281 | 9.4.5.34 |
| Reserved | 282-56796 | n/a |

TABLE 11-15

ANQP Usage

| ANQP-element Name | ANQP-Element (subclause) | ANQP-element type | AP | Mobile Device |
|---|---|---|---|---|
| Extended Emergency Information | 9.4.5.34 | S | T | R |

Symbols
Q element is an ANQP Query
S element is an ANQP Response
T ANQP-element may be transmitted by MAC entity
R ANQP-element may be received by MAC entity The EEI ANQP-element indicates the EEI available within the IEEE 802.11 access network.

Figure 5:
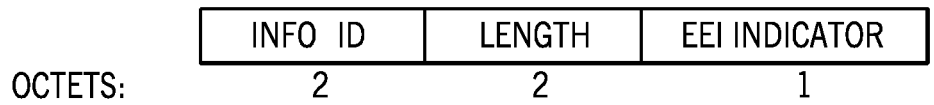
FIG. 5 illustrates an example Extended Emergency Information (EEI) element, according to some implementations.

The format of an EEI ANQP-element 500 is provided in FIG. 5. As shown in FIG. 5, according to an example, the EEI Indicator field of the EEI ANQP-element 500 is one octet in length defined as follows in the following table:

| Meaning | value | EEI Type |
|---|---|---|
| EEI type 1 supported | 0 | BSSID |
| EEI type 2 supported | 1 | MAC address |
| EEI type 3 | 2 | IP address |
| supported EEI type 4 supported | 3 | BT-PDA |
| Reserved | 4-15 | |

Figure 6:
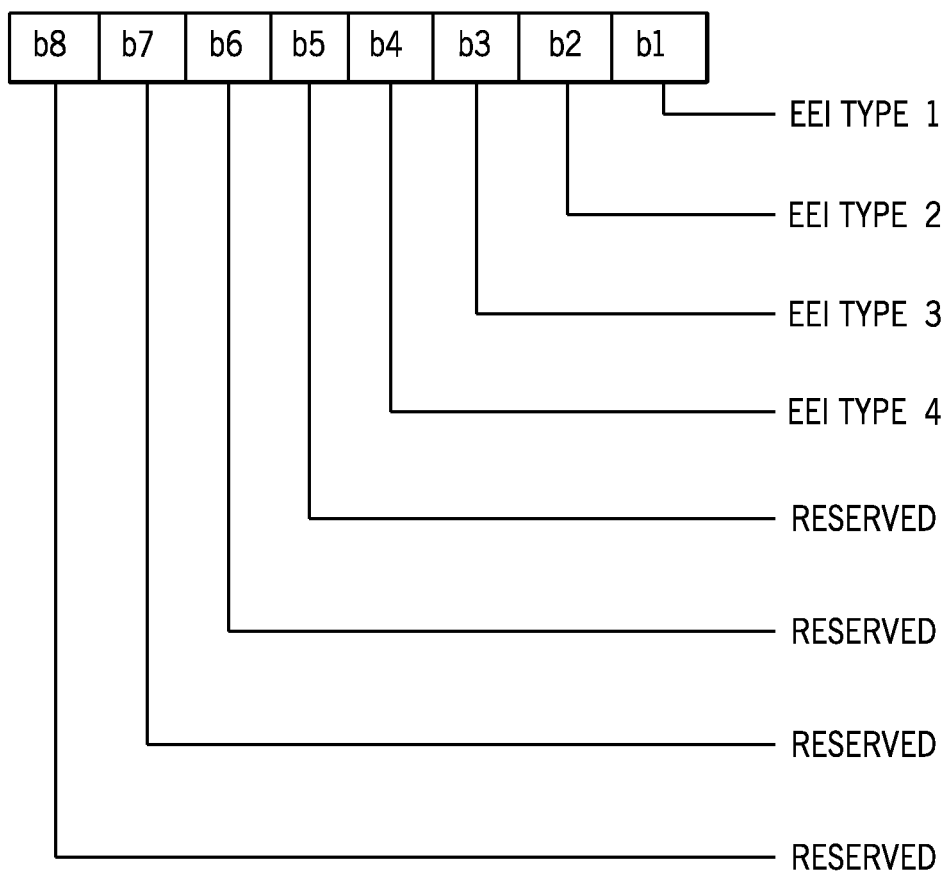
FIG. 6 illustrates an EEI indicator field, according to some implementations.

An alternative encoding of the EEI Indicator field is as a one-octet bit mask, as shown in FIG. 6. In the example of FIG. 6, bits b4, b3, b2, b1 if set to an active value (e.g., logic "1") indicates the respective EEI type supported (EEI type 4, 3, 2, 1). The encoding of FIG. 6 has the benefit of being able to advertise multiple EEI types in the same ANQP-element (if multiple ones of bits b4, b3, b2, b1 are set).

2.7 RAN Broadcast Information Definition

As discussed above, RAN broadcast information can be used to perform a WLAN check (e.g., 304-*a* in FIG. 3 or 404-*a* in FIG. 4).

The following are examples of changes to 3GPP TS.36.331, or alternative documents, where changes are highlighted by underlined text.

6.3 RRC Information Elements
6.3.1 System Information Blocks
SystemInformationBlockType17

The IE SystemInformationBlockType17 contains information relevant for traffic steering between E-UTRAN and WLAN.

SysteminformationBlockType17 information element

```
-- ASN1START
SystemInformationBlockType17-r12 ::=   SEQUENCE {
    wlan-OffloadInfoPerPLMN-List-r12       SEQUENCE (SIZE (1..maxPLMN-r11)) OF
                                               WLAN-OffloadInfoPerPLMN-r12      OPTIONAL, -- Need OR
    lateNonCriticalExtension               OCTET STRING (CONTAINING
    SystemInformationBlockType17-v16XX-TEs)        OPTIONAL, -- Need OR
    ...
}
WLAN-OffloadInfoPerPLMN-r12 ::=        SEQUENCE {
    wlan-OffloadConfigCommon-r12           WLAN-OffloadConfig-r12               OPTIONAL, -- Need OR
    wlan-Id-List-r12                       WLAN-Id-List-r12                     OPTIONAL, -- Need OR
    ...
}
WLAN-Id-List-r12 ::=                   SEQUENCE (SIZE (1..maxWLAN-Id-r12)) OF WLAN-Identifiers-r12
WLAN-Identifiers-r12 ::=               SEQUENCE {
    ssid-r12                               OCTET STRING (SIZE (1..32))          OPTIONAL, -- Need OR
    bssid-r12                              OCTET STRING (SIZE (6))              OPTIONAL, -- Need OR
    hessid-r12                             OCTET STRING (SIZE (6))              OPTIONAL -- Need OR
    ...
}
-- Late non critical extensions
SystemInformationBlockType17-v16XX-IEs ::= SEQUENCE {
    wlan-OffloadInfoPerPLMN-List-r16       SEQUENCE (SIZE (1..maxPLMN-r11)) OF
                                               WLAN-OffloadInfoPerPLMN-r16      OPTIONAL, -- Need OR
WLAN-OffloadInfoPerPLMN-r16 ::=        SEQUENCE {
    wlan-OffloadConfigCommon-r12           WLAN-OffloadConfig-r12               OPTIONAL, -- Need OR
    wlan-Id-List-r16                       WLAN-Id-List-r16                     OPTIONAL, -- Need OR
    ...
}
WLAN-Id-List-r16 ::=                   SEQUENCE (SIZE (1..maxWLAN-Id-r12)) OF WLAN-Identifiers-r16
WLAN-Identifiers-r16 ::=               SEQUENCE {
    ssid-r16                               SSID-r16                             OPTIONAL, -- Need OR
    bssid-r12                              BSSID-r16                            OPTIONAL, -- Need OR
    hessid-r16                             HESSID-r16                           OPTIONAL, -- Need OR
    ...
}
SSID-r16                               SEQUENCE {
    ssid-r12                               OCTET STRING (SIZE (1..32))
    eeiType-r16                            ENUMERATED {type1, type2, type1type2}    OPTIONAL, --
Need OR
}
```

| SysteminformationBlockType17 information element | | | |
|---|---|---|---|
| BSSID-r16<br>  bssid-r12<br>  eeiType-r16.<br>Need OR<br>}<br>HESSID-r16<br>  hessid-r12<br>  eeiType-r16<br>Need OR<br>-- ASN1STOP | SEQUENCE {<br>OCTET STRING (SIZE (6))<br>ENUMERATED {type1, type2, type1type2}<br><br><br>SEQUENCE {<br>OCTET STRING (SIZE (6))<br>ENUMERATED {type1, type2, type1type2} | <br><br>OPTIONAL, --<br><br><br><br><br>OPTIONAL, -- | |

Table 1

Example changes to 3GPP TS 36.331
SystemInformationBlockType17 field descriptions bssid
Basic Service Set Identifier (BSSID) defined in IEEE 802.11-2012.
hessid
Homogenous Extended Service Set Identifier (HESSID) defined in IEEE 802.11-2012 and Wi-Fi Alliance Passpoint.
ssid
Service Set Identifier (SSID) defined in IEEE 802.11-2012.
eeiType
Indicates the EEI type(s) as defined in IEEE 802.11xxxx (to be defined)

2.8 EAP Mechanism

The following describes details associated with using an EAP procedure in tasks 304-c and 404-c of FIGS. 3 and 4, respectively.

EAP is a mechanism that can be used to authenticate a user. There are two alternative solutions in using EAP signaling to indicate to the UE 108 what EEI type the WLAN supports.

According to a first EAP solution, the UE 108 sends its MAC address in a network access identifier (NAI). In the first solution, the UE 108 has either discovered the WLAN capability using other mechanisms discussed in this disclosure or just sends (without knowing if the WLAN supports EEI) its MAC address to the WLAN 102.

According to a second EAP solution, the UE 108 authenticates with the WLAN 102 using an NAI, and as part of the EAP procedure, receives an indication of whether an EEI type(s) is supported by the WLAN 102. The UE 108 then receives an EAP response with the EEI type(s) that is supported by the WLAN 102.

2.8.1 Process for the First EAP Solution

Figure 7:
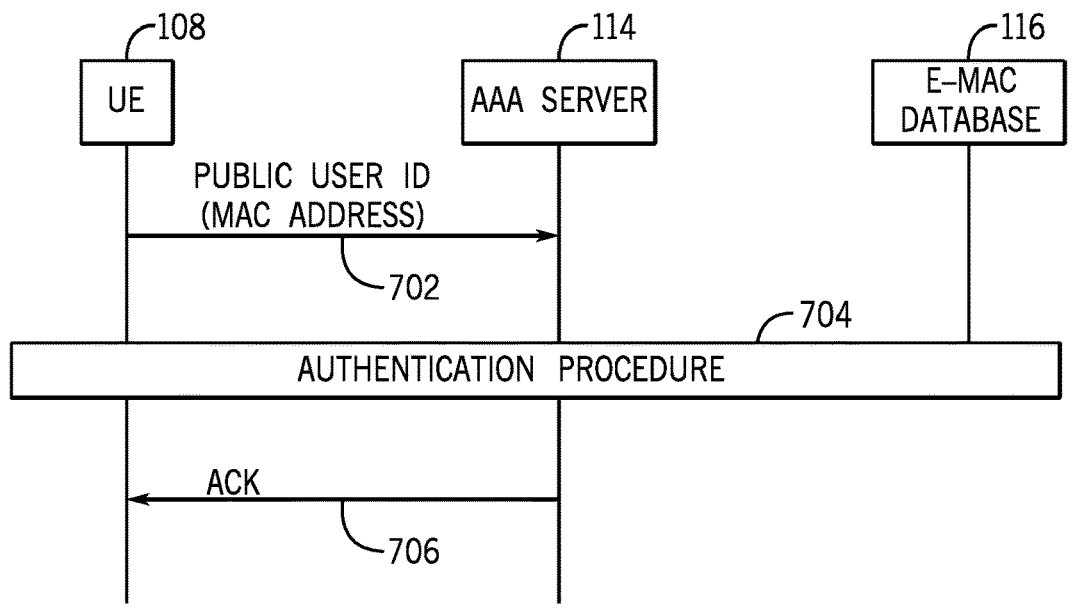
FIGS. 7 and 8 are message flow diagrams of Extensible Authentication Protocol (EAP) processes, according to further implementations.

FIG. 7 shows an example process for the first EAP solution. In the process of FIG. 7, the MAC address used is a Public User ID, but can be any part of the NAI (see Section 2.8.3 below).

The UE 108 sends (at 702) a message to the network, where the message includes the MAC address (e.g., a Public User ID) as part of the NAI. The message is received by an authentication function, such as the AAA server 114, which receives the MAC address as part of the NAI.

The UE 108 then proceeds (at 704) with an authentication procedure that involves the AAA server 114 and the E-MAC database 116. To complete authentication, the AAA server 114 sends (at 706) back a message (e.g., an acknowledgement), which indicates either a success or failure and optionally includes an indication of whether the MAC address was received by the AAA server 114. In the case of failure, error codes may be contained in the message 706.

2.8.2 Process for the Second EAP Solution

Figure 8:
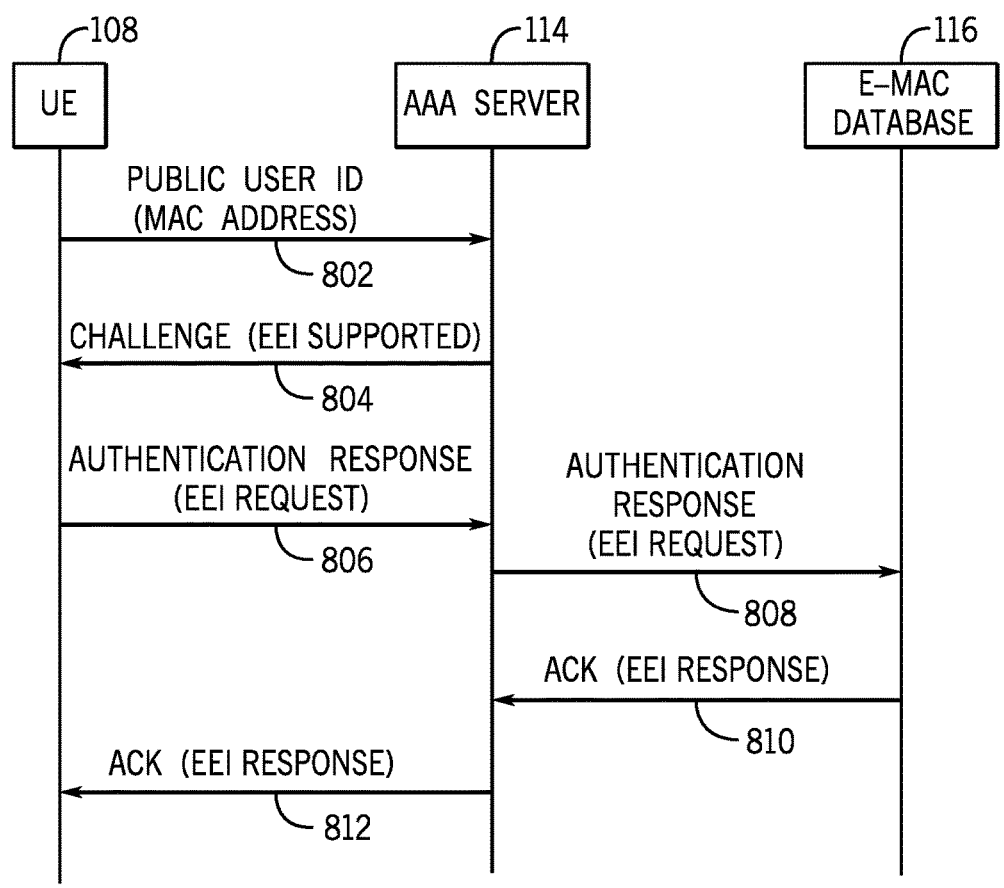

FIG. 8 shows an example process for the second EAP solution. FIG. 8 uses 4G (LTE) terms. However, the AAA server 114 can be replaced with an Access and Mobility Management Function (AMF) and/or Unified Data Management (UDM). The E-MAC database 116 can also be a UDM.

The UE 108 sends (at 802) a message to the network, where the message includes the MAC address (e.g., Public User ID) as part of the NAI. The message is received by an authentication function, such as the AAA server 114, which receives the MAC address as part of the NAI.

In FIG. 8, the authentication procedure is initiated by the AAA server 114, which sends (at 804), to the UE 108, a challenge that includes an indication that EEI is supported. The UE 108 responds by sending (at 806) an authentication response to the AAA server 114, where the authentication response includes an EEI request. The authentication response containing the EEI request is sent (at 808) from the AAA server 114 to the E-MAC database 116, which responds with an acknowledgment (at 810) that includes an EEI response. The AAA server 114 forwards (at 812) the acknowledgment that includes the EEI response to the UE 108. In the case of failure, error codes may be contained in the message 812.

The following represents how the EAP framework can be used to obtain EEI data in a 5G network or 4G or EPC networks, or accessing WLANs, the difference being the names of the functions.

FIGS. 10A-10F show Table 2 represents changes (underlined text) that are required to 3GPP TS 24.302 and shows an example of how the data can be sent in an EAP-AKA' exchange.

2.8.2 NAI Construct

The NAI can be any of the following:

| | |
|---|---|
| The username | MAC@domain |
| Part of the username | Username.mac@domain |
| Part of the domain e.g. a label | username@mac.domain |
| Part of a decorated NAI | 1stdomain@mac!$2^{nd}$ domain |

2.9 IMS Procedures and SIP Updates

The information elements for IMS procedures and SIP updates can be coded in existing headers, feature tags, or can be encoded in new headers, feature tags or XML or combination of. It can be encoded with the URI.

FIG. 11 depicts Table 3 shows two alternative examples of feature tag encoding, where 1st shows an example of a BSSID associated with a MAC address and the 2nd shows just a UE MAC address.

2.9.1 Non-3GPP Header Field

A new header field, for example named Non-3GPP-Network-Info header field, can be defined.

The UE 108 can use a 3GPP access to access the IM core network subsystem.

The UE 108 can support one or more radio access technologies (e.g., WLAN).

The UE 108 includes the Non-3GPP-Network-Info header field specified in Section 2.11 below, if the information is available, in every request or response in which the P-Access-Network-Info header field is present.

2.10 Caching WLAN Identifiers in the UE

The UE 108 determines the identity of a WLAN, WLAN ID, e.g. Service Set identifier (SSID). The UE 108 then compares the WLAN ID(s) against a list of WLAN IDs in memory. The list contains WLAN IDs that are known to support various EEI type(s). The list could be implemented as (1) a single list with an indication of the EEI type(s), or (2) a list of EEI Type 1 WLAN IDs, list of EEI Type 2 WLAN IDs, etc.

The information can be stored in Management Engine (ME) memory or on the Universal Integrated Circuit Card (UICC) or another storage device, and then subsequently read into UE memory.

2.11 Encoding of Data to Include in SIP Message

This section shows an example of how to encode the SIP messages within 3GPP standards.

7.2.Ab Definition of Non-3GPP-Network-Info Header Field 7.2.Ab.1 Introduction

A User Agent (UA) supporting one or more non-3GPP radio access technology (e.g. WLAN) but using a 3GPP access or 3GPP IP-CAN to access the IM CN subsystem can use this header field to relay information to its service provider about the non-3gpp radio access technology the UE most recently observed. For example, a UE making an emergency call using the Evolved Packet Core (EPC) via 3gpp access to the IM CN subsystem uses this header field to convey information that can be used to determine a location to its service provider.

7.2.Ab.2 Applicability Statement for the Non-3GPP-Network-Info Header Field

The non-3GPP-Network-Info field is applicable within a trust domain. The non-3GPP-Network-Info header field can be included in any SIP requests and responses in which the P-Access-Network-Info header field is present.

The non-3GPP-Network-Info header field is populated with the following contents:

1) the access-type field is set to one of "3GPP-WLAN", "untrusted-non-3GPP-VIRTUAL-EPC", "WLAN-no-PS", "3GPP-GAN", "VIRTUAL-no-PS" as appropriate to the additional access technology the information is provided about;
2) if the access-type field set to one of "3GPP-WLAN", "untrusted-non-3GPP-VIRTUAL-EPC", "WLAN-no-PS", "3GPP-GAN", "VIRTUAL-no-PS", an "i-wlan-node-id" parameter is set to the ASCII representation of the hexadecimal value of the AP's MAC address without any delimiting characters;
   NOTE: The AP's MAC address is provided in the BSSID information element.
   EXAMPLE: If the AP's MAC address=00-0C-F1-12-60-28, then i-wlan-node-id is set to the string "000cf1126028".
   NOTE: "i-wlan-node-id" parameter is not restricted to I-WLAN. "i-wlan-node-id" parameter can be inserted for a WLAN which is not an I-WLAN.
3) if the access-type field set to one of "3GPP-WLAN", "untrusted-non-3GPP-VIRTUAL-EPC", "WLAN-no-PS", "3GPP-GAN", "VIRTUAL-no-PS", an "UE-id" parameter is set to the ASCII representation of the hexadecimal value of the UE's MAC address without any delimiting characters; or
   EXAMPLE: If the UE's MAC address=00-0C-F1-12-60-28, then UE-id is set to the string "000cf1126028".
4) the non-3gpp-info-age parameter indicates the relative time since the information about the non-3GPP identity was collected by the UE. The value of the parameter is a number indicating seconds.

7.2.Ab.4 Procedures at the UA

A UA that supports this extension and is willing to disclose the related parameters may insert the non-3GPP-Network-Info header field in any SIP request or response in which the P-Access-Network-Info header field is allowed to be present.

7.2.Ab.5 Procedures at the Proxy

A SIP proxy shall not modify the value of the Cellular-Network-Info header field.

A SIP proxy shall remove the non-3GPP-Network-Info header field when the SIP signaling is forwarded to a SIP server located in an untrusted administrative network domain.

A SIP proxy that is providing services to the UA, can act upon the information present in the non-3GPP-Network-Info header field value, if present, to provide a different service depending on the network or the location through which the UA is accessing the server. A SIP proxy can determine the age of the non-3GPP identity information from the non-3GPP-info-age parameter. Depending on the recentness of the information the SIP proxy can perform different procedures.

7.2.Ab.6 Security Considerations

The non-3GPP-Network-Info header field contains sensitive information. The non-3GPP-Network-Info header field should be removed when sent outside the trust domain.

A UE is not expected to receive the non-3GPP-Network-Info header field.

Example Device

Figure 9:
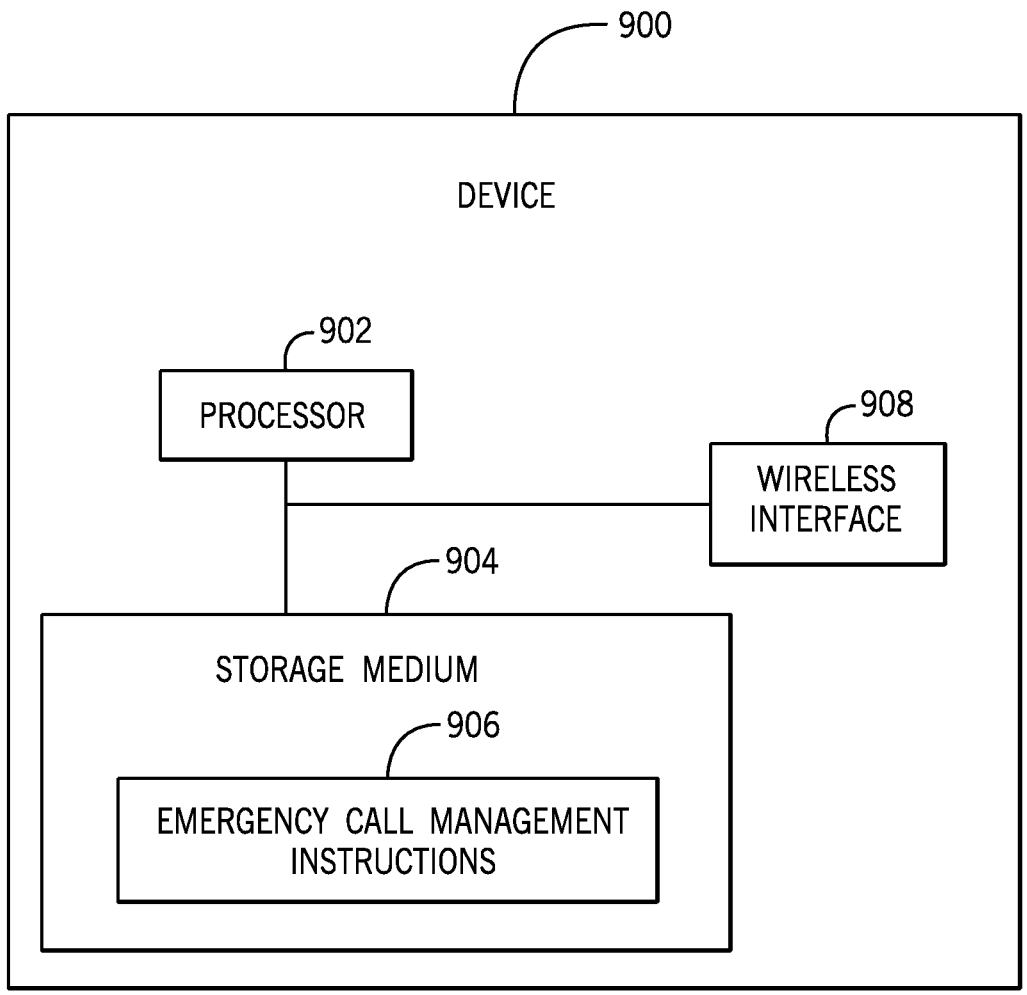
FIG. 9 is a block diagram of a device according to some implementations.

FIG. 9 is a block diagram of an example device 900, which can be a UE or other type of electronic device, or can be an AP or cellular access node.

The device 900 includes one or more hardware processors 902. A hardware processor can include a microprocessor, a core of a multi-core microprocessor, a microcontroller, a programmable integrated circuit, a programmable gate array, a digital signal processor, or another hardware processing circuit.

The device 900 further includes a non-transitory machine-readable or computer-readable storage medium 904 that stores machine-readable instructions executable on the one or more hardware processors 902 to perform respective tasks.

The machine-readable instructions can include emergency call management instructions 906, which can execute in a UE or an AP or cellular access node, for example.

The device 900 further includes a wireless interface 908, which can include a wireless transceiver and protocol layers of a protocol stack for communications over a wireless link.

The storage medium 904 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disc (CD) or a digital video disc (DVD);

or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
    receiving, by a wireless device from a wireless access network node, an indication of a supported extended emergency information (EEI) type supported by a wireless local area network (WLAN), wherein the supported EEI type is selected from among a plurality of different EEI types;
    sending, by the wireless device, a message relating to an emergency call, the message including EEI data according to the supported EEI type; and
    sending, by the wireless device, the EEI data according to the supported EEI type to a node for storage of the EEI data according to the supported EEI type by the node, wherein the node comprises an Extended Medium Access Control (E-MAC) database.

2. The method of claim 1, further comprising:
    in response to the wireless device transitioning from the wireless access network node to another wireless access network node, sending, by the wireless device, updated EEI data according to the supported EEI type to the node for storage of the updated EEI data according to the supported EEI type by the node.

3. The method of claim 1, further comprising:
    in response to determining that the WLAN supports the supported EEI type, determining, by the wireless device, whether a Registered Public Land Mobile Network (RPLMN) supports the supported EEI type.

4. The method of claim 3, wherein determining that the RPLMN supports the supported EEI type comprises:
    determining that an identifier of a PLMN to which the WLAN has connectivity matches an identifier of the RPLMN or an identifier of an equivalent PLMN of the RPLMN.

5. The method of claim 1, wherein the message comprises a Session Initiation Protocol (SIP) message to initiate the emergency call.

6. A method comprising:
    receiving, by a wireless device from a wireless access network node, an indication of a supported extended emergency information (EEI) type supported by a wireless local area network (WLAN), wherein the supported EEI type is selected from among a plurality of different EEI types; and
    sending, by the wireless device, a message relating to an emergency call, the message including EEI data according to the supported EEI type, wherein the EEI data includes the supported EEI type that is used as an index to an entry of an Extended Medium Access Control (E-MAC) database.

7. The method of claim 6, further comprising:
    sending, by the wireless device to the WLAN, a request to determine the supported EEI type,
    wherein the indication of the supported EEI type is received by the wireless device responsive to the request.

8. The method of claim 7, wherein the request comprises a Public Action frame or an Access Network Query Protocol (ANQP) request.

9. The method of claim 6, wherein the plurality of different EEI types comprise one or more of:
    a first EEI type that uses a WLAN access point Basic Service Set Identifier (BSSID) as an extended emergency location (EEL),
    a second EEI type that uses a Medium Access Control (MAC) address of the wireless device in the WLAN as the EEL,
    a third EEI type that uses an Internet Protocol (IP) address of the wireless device in the WLAN as the EEL, and
    a fourth EEI type that uses a Bluetooth Public Device Address (BT-PDA) as the EEL.

10. The method of claim 6, wherein the indication of the supported EEI type is received in broadcast information.

11. The method of claim 6, wherein the indication of the supported EEI type is received in a response to a request sent by the wireless device.

12. The method of claim 6, wherein the indication of the supported EEI type is received in an authentication procedure for authenticating the wireless device.

13. A wireless device comprising:
    a wireless interface to communicate with a wireless access network node; and
    at least one processor configured to:
        receive, from the wireless access network node, an indication of a supported extended emergency information (EEI) type supported by a wireless local area network (WLAN), wherein the supported EEI type is selected from among a plurality of different EEI types;
        send a message relating to an emergency call, the message including extended emergency location (EEL) information according to the supported EEI type, wherein the EEL information relates to a location of the wireless device, and different types of the EEL information are associated with the plurality of different EEI types; and
        send the EEL information according to the supported EEI type to a node for storage of the EEL information according to the supported EEI type in an Extended Medium Access Control (E-MAC) database.

14. The wireless device of claim 13, wherein the at least one processor is configured to:
    in response to determining that the WLAN supports the supported EEI type, determine whether a Registered Public Land Mobile Network (RPLMN) supports the supported EEI type.

15. The wireless device of claim 13, wherein the EEL information includes the supported EEI type that is used as an index to an entry of the E-MAC database.

16. The method of claim 1, wherein the indication is received from the wireless access network node that is a WLAN access point (AP) or a radio access network (RAN) node.

* * * * *